(No Model.)

H. L. RICE.
Miners' Candle Holder.

No. 239,548. Patented March 29, 1881.

Attest.
Charles Pickles
Geo. H. Knight

Inventor.
Hugh L. Rice
By Knight Bros.
Attys

UNITED STATES PATENT OFFICE.

HUGH L. RICE, OF FAIR PLAY, COLORADO.

MINER'S CANDLE-HOLDER.

SPECIFICATION forming part of Letters Patent No. 239,548, dated March 29, 1881.

Application filed December 20, 1880. (No model.)

*To all whom it may concern:*

Be it known that I, HUGH L. RICE, of Fair Play, in the county of Park and State of Colorado, have invented a certain new and useful Improvement in Miners' Candle-Holders, of which the following is a full, clear, and exact description, reference being had to the accompanying drawings, forming part of this specification.

My invention relates to a candle-holder intended more especially for use in mining; and it consists in a handle, a socket for receiving and holding the candle, a spike, and a hook, the two latter being arranged so that the spike is locked in place by the hook when both are open, and so that both may be turned and inclosed within the handle when desired, as will more fully appear hereinafter.

Figure 1:
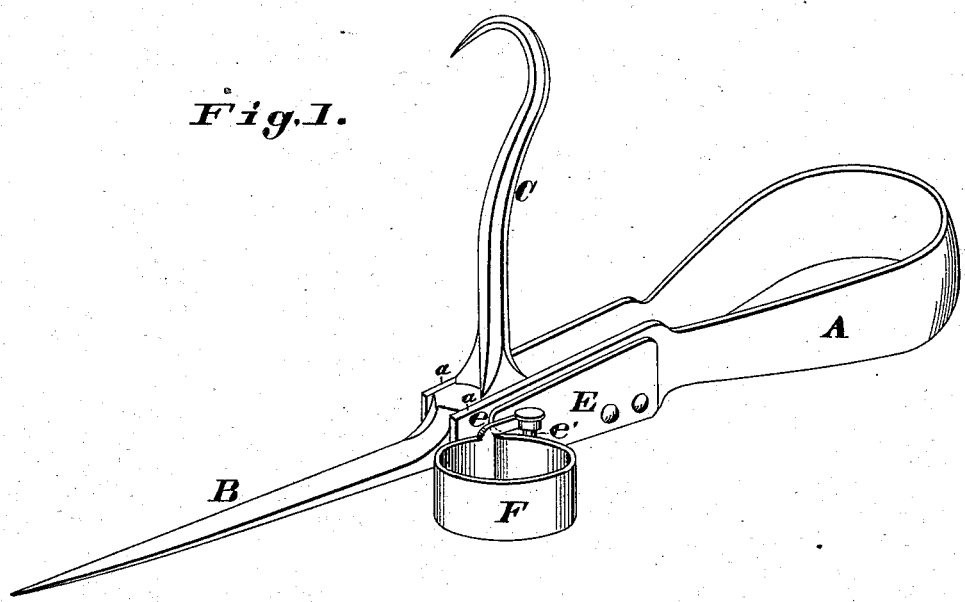
Figure 2:
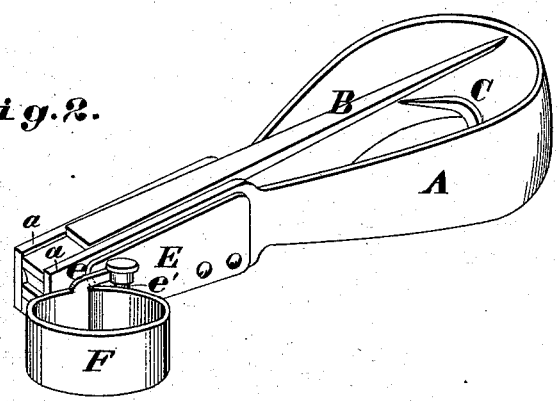
Figure 3:
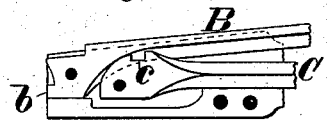
Figure 4:
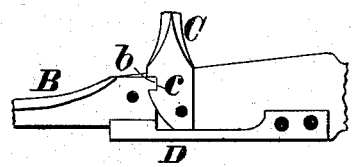

In the drawings, Figure 1 is a perspective view, showing the spike and locking-hook in an open position, ready for use. Fig. 2 is a perspective view with the spike and hook closed. Fig. 3 is a detail view, showing the manner in which the spike and hook can be turned so as to be inclosed within the handle; and Fig. 4 is a similar view, showing the spike and hook open, and the former locked in place by the latter.

A is the handle, which consists of a strip or plate of metal bent into substantially the form shown in Figs. 1 and 2. Within its ends $a\ a$ are pivoted the spike B and locking-hook C. It will be seen that the spike and hook are so pivoted to the handle that when they are both open the projection $b$ on the rear of the spike will engage the notch $c$ of the hook, and thus the spike is rigidly held in its open position until the hook is closed. The purpose of this locking will presently be explained.

D is a spring, riveted to the handle, as shown, its office and operation being the same as the back-spring of a common pocket-knife.

E is a plate of metal, (preferably spring metal,) riveted to the handle, as shown in Figs. 1 and 2, and being bent into a ring or socket, F, for holding the candle. I have shown the end of the plate E opposite that which is attached to the handle A as terminating in projections $e$, which surround a pin, $e'$, or its equivalent. It will be seen that by pressing back on the pin the size of the socket F will be enlarged. Thus it can be opened to receive the candle, and when released will close upon it and hold it firmly in place, and is adjusted to receive any-sized candle.

When the device is in use the spike and locking-hook are opened into the position shown in Figs. 1 and 4. The spike is then used for sticking into a timber or clay, if the same are handy, and if not, then the hook may be used to engage the wall of the mine or other object.

When the device is not in use the hook and spike may be turned down and inclosed within the handle, as shown in Fig. 2, so that it can conveniently be carried in the pocket. To allow these parts to be closed, and at the same time to have the spike firmly locked in place by the hook when they are open, the described connection between them is necessary. It is quite necessary to have the spike locked in position when open, for otherwise it would be apt to close against the force of the back-spring when carelessly or roughly struck against the object, as described. The point of the hook is at right angles to the spike.

I am aware that miners' candle-holders have been constructed with a bow, sticker, and hook, the sticker and hook folding within the bow. Such construction therefore I do not claim, broadly.

Having thus described my invention, what I claim as new, and desire to secure by Letters Patent, is—

1. In a folding candle-holder for miners' use, the combination of a bow or handle, A, spike B, and hook C, the said spike being secured in front of the hook, and locked by the said hook when the said spike and the said hook are opened, as and for the purpose set forth.

2. The combination of handle A, spike B, locking-hook C, spring D, and ring or socket E F, as set forth.

3. The adjustable ring or socket E, in combination with the handle A, spike B, locking-hook C, and spring D, as set forth.

HUGH L. RICE.

Witnesses:
SAML. KNIGHT,
GEO. H. KNIGHT.